(12) United States Patent
Crewl (10) Patent No.: US 11,121,532 B2
(45) Date of Patent: Sep. 14, 2021

(54) RAINTIGHT ELECTRICAL CONDUIT COUPLING AND CONNECTOR

(71) Applicant: Glenn Crewl, Hemet, CA (US)

(72) Inventor: Glenn Crewl, Hemet, CA (US)

( * ) Notice: Subject to any disclaimer, the term of this patent is extended or adjusted under 35 U.S.C. 154(b) by 99 days.

(21) Appl. No.: 16/587,049

(22) Filed: Sep. 30, 2019

(65) Prior Publication Data

US 2021/0098977 A1    Apr. 1, 2021

(51) Int. Cl.
*H02G 3/00* (2006.01)
*H02G 3/06* (2006.01)
*H02G 3/08* (2006.01)

(52) U.S. Cl.
CPC ........... *H02G 3/0666* (2013.01); *H02G 3/088* (2013.01)

(58) Field of Classification Search
CPC .............................. H02G 3/0666; H02G 3/088
See application file for complete search history.

(56) References Cited

U.S. PATENT DOCUMENTS

| | | | | |
|---|---|---|---|---|
| 3,527,484 A * | 9/1970 | Walkden | ................. | F16L 49/02 285/236 |
| 5,165,735 A * | 11/1992 | Nardi | .................... | F16L 25/065 285/322 |
| 6,106,031 A * | 8/2000 | Guginsky | ............. | F16L 21/002 285/151.1 |
| 6,988,746 B2 * | 1/2006 | Olson | ..................... | F16L 19/12 285/149.1 |
| 9,705,295 B1 * | 7/2017 | Smith | .................. | H02G 3/0616 |
| 10,465,825 B2 * | 11/2019 | Conrad | ................. | F16L 17/025 |

* cited by examiner

*Primary Examiner* — Pete T Lee
(74) *Attorney, Agent, or Firm* — Robert S. Smith (57) ABSTRACT

A connector for joining respective axial extremities of associated first and second axial sections of electrical conduit which includes a cylindrical sleeve that has an interior surface and an exterior surface as well as a first axial extremity and a second axial extremity and a geometric axis. The cylindrical sleeve has an exterior surface proximate to the first axial extremity that includes a first peripheral rib extending around the entire circumferential extent of the exterior surface. The first peripheral rib has an outside diameter that is greater than the diameter of the cylindrical sleeve proximate to the first axial extremity. The cylindrical sleeve has an exterior surface proximate to the second axial extremity that includes a second peripheral rib extending around the entire circumferential extent of the exterior surface, the rib has an outside diameter is greater than the diameter of the cylindrical sleeve proximate to the second axial extremity.

25 Claims, 6 Drawing Sheets

RAINTIGHT ELECTRICAL CONDUIT COUPLING AND CONNECTOR

TECHNICAL FIELD

The present invention is generally directed to electrical power distribution. More particularly, the present invention is directed to conduit systems. Even more particularly, the present invention is directed to couplings and connectors for conduit systems.

The term "raintight" is a term of the art indicative of connectors and couplings that are liquid-tight tight in normal use. Some embodiments of the present invention are suitable for liquid-tight applications. Other embodiments eliminate a seal while retaining the advantages of quickly and easily achieving a connection where the ambient does have not have liquid in the ambient. Typically, dry indoor applications do not require the seal.

Customarily in the art the term "connector" refers to apparatus for connecting, for example, 2 pieces of conduit and the term "coupling" refers to apparatus for connecting, for example, a conduit to a box. Since the present invention may be utilized in the construction of connectors as well as couplings, the terms may be used interchangeably herein. Those skilled in the art will clearly understand that the interface with a conduit as described and claimed herein can be utilized twice in what the traditional term of the art deems to be a connector and once in apparatus that the traditional term of the art deems to be a coupling.

Embodiments of the present invention have particular application to outdoor installations exposed, for example, to rain. Liquid-tight conduit fittings prevent water and other moisture from affecting the wiring within the conduit. The fittings in accordance with the present invention have particular application to metal conduit often referred to as EMT. Typically, the conduit is thin-walled and non-threaded. The EMT conduit is used to enclose electrical wires in, for example, warehouses and manufacturing facilities where the wiring may be run along the walls and the ceiling such that the conduit is exposed. Where the electrical wiring and the surrounding EMT conduit connect to an electrical device, such as a motor, transformer, or fuse box, there must be a rain-tight seal between the EMT conduit and the electrical device. Typically, a ring is used to connect the EMT conduit to an EMT body, which may be a connector protruding from the electrical device. When the rain-tight seal is formed, an electrical ground continuity between the EMT conduit and the EMT body also may be formed.

Rainwater that contacts a metal conduit becomes more conductive and it is undesirable within the conduit. As such water passes through the interior of the conduit system, it may short out electrical circuits, switchgear and the like. Of course, corrosion from the intrusion of the rainwater compromises such installation still further. For these reasons' engineers specify that raintight coupling and connectors for such conduits be used in wet locations, such as the roofs and exteriors of buildings.

Other embodiments of the present invention omit the seal required for the rainwater, for example, indoor applications. Although the description herein will dwell on straight connectors and couplings, those skilled in the art will recognize that other embodiments may be angled at 90 degrees or other angular relationship.

BACKGROUND OF THE INVENTION

The prior art rain tight connectors often include compression fittings. For example, a well-known and widely distributed compression nut conduit coupling includes a sleeve having first and second compression nuts respectively disposed at the axial extremities. Installation requires (1) aligning the first and second conduits with the coupling, (2) gripping the sleeve with water pump pliers while simultaneous gripping the first compression nut with another pair of water pump pliers, (3) rotating the first compression nut relative to the sleeve followed by (4) gripping the sleeve with water pump pliers while simultaneous gripping the second compression nut with another pair of water pump pliers and (5) rotating the second compression nut relative to the sleeve. The complications inherent in this sequence are both awkward and time consuming.

Still another issue with known compression fittings is that in the event of disassembly of the coupling, the required seal is often improperly reassembled leading to subsequent leakage.

From the above, it is therefore seen that there exists a need in the art to overcome the deficiencies and limitations described herein and above.

SUMMARY OF THE INVENTION

The shortcomings of the prior art are overcome and additional advantages are provided through a connector for joining respective axial extremities of first and second electrical conduits which includes a cylindrical sleeve has an interior surface and an exterior surface as well as a first axial extremity and a second axial extremity and a geometric axis. The cylindrical sleeve has an exterior surface proximate to the first axial extremity that includes a first peripheral rib extending around the entire circumferential extent of the exterior surface. The first peripheral rib has an outside diameter that is greater than the diameter of the cylindrical sleeve proximate to the first axial extremity. The cylindrical sleeve has an exterior surface proximate to the second axial extremity that includes a second peripheral rib extending around the entire circumferential extent of the exterior surface, the rib has an outside diameter is greater than the diameter of the cylindrical sleeve proximate to the second axial extremity.

A first generally cylindrical clamp has an inboard section and an outboard section, the inboard section of the first generally cylindrical clamp is dimensioned and configured for encircling the first axial extremity of the cylindrical sleeve and the outboard section being dimensioned and configured for encircling the axial extremity of the associated first of electrical conduit. More specifically, the outboard section is dimensioned and configured to have first line contact with the associated first electrical conduit. A second generally cylindrical clamp has an inboard section and an outboard section, the inboard section of the second generally cylindrical clamp being dimensioned and configured for encircling the second axial extremity of the cylindrical sleeve and the outboard section being dimensioned and configured for encircling the axial extremity of the associated second electrical conduit, the outboard section being dimensioned and configured to have a second line contact with the associated second electrical conduit.

In some embodiments the connector further includes a first cylindrical seal that has an exterior surface dimensioned and configured for insertion into the first axial extremity of the cylindrical sleeve as well as for sealing engagement with the interior surface of the first axial extremity of the cylindrical sleeve, the first cylindrical seal has an interior surface dimensioned and configured for sealing engagement with the exterior surface of the first electrical conduit; and a geometric axis coincident with the geometric axis of the cylindrical sleeve. A second cylindrical seal may have an exterior surface dimensioned and configured for insertion into the interior surface of second axial extremity of the cylindrical sleeve as well as for sealing engagement with the interior surface of second axial extremity of the cylindrical sleeve, the second cylindrical seal has an interior surface dimensioned and configured for sealing engagement with the exterior of the second electrical conduit and a geometric axis coincident with the geometric axis of the cylindrical sleeve. Some embodiments have an outboard section of the first generally cylindrical clamp that further includes structure dimensioned and configured to have a third line contact with the associated first electrical conduit.

The outboard section of the second generally cylindrical clamp may further include structure dimensioned and configured to have a fourth line contact with the associated second electrical conduit. The third line contact may be disposed within a fourth plane that is normal to the geometric axis and the fourth line contact may also be disposed within fourth plane that is normal to the geometric axis and spaced from the third plane. Each generally cylindrical clamp may include an arcuate band has first and second extremities to which respective first and second generally planar plates are fixed, the first and second plates including bores therein accommodating a threaded fastener whereby rotation of the threaded fastener tightens the generally cylindrical clamp. The first and second peripheral ribs proximate to the first axial extremity of the cylindrical sleeve may be disposed in spaced relationship. The cylindrical sleeve may have an exterior surface proximate to the first axial extremity that includes a first peripheral rib extending around the entire circumferential extent of the exterior surface, the first peripheral rib has an outside diameter that is greater than the diameter of the cylindrical sleeve proximate to the first peripheral rib and further includes a second peripheral rib extending around the entire circumferential extent of the exterior surface, the first and second peripheral ribs have outside diameters greater than the diameter of the cylindrical sleeve intermediate the first and second peripheral ribs.

The connector may have a first generally cylindrical clamp has an inboard section and an outboard section. The inboard section of the first generally cylindrical clamp may be dimensioned and configured for encircling the first axial extremity of the cylindrical sleeve being dimensioned and configured for engagement with the first and second peripheral ribs whereby the stability of the engagement is enhanced. The cylindrical sleeve may have an exterior surface proximate to the second axial extremity that includes first and second spaced peripheral ribs extending around the entire circumferential extent of the exterior surface. The first and second peripheral ribs may have an outside diameter that is greater than the diameter of the cylindrical sleeve intermediate the first and second peripheral ribs. The second generally cylindrical clamp may have an inboard section and an outboard section. The inboard section of the first generally cylindrical clamp may be dimensioned and configured for encircling the first axial extremity of the cylindrical sleeve and has nesting engagement with the first and second peripheral ribs and the part of the cylindrical sleeve intermediate the first and second peripheral ribs whereby the stability of the engagement is enhanced.

In some embodiments first cylindrical seal has an interior surface dimensioned and configured for sealing engagement with the exterior surface of the first electrical conduit is axially tapered whereby engagement of the exterior surface of the first electrical conduit is progressively tighter upon progressively greater axial engagement of the first axial section of electrical conduit.

Other embodiments of the present invention include apparatus for attachment to an axial extremity of an associated metallic electrical conduit which includes a cylindrical sleeve has an interior surface and an exterior surface as well as a first axial extremity and a second axial extremity and a geometric axis. The cylindrical sleeve has an exterior surface proximate to the first axial extremity that includes a first peripheral rib extending around the entire circumferential extent of the exterior surface, the first peripheral rib has an outside diameter is greater than the diameter of an axial part of the cylindrical sleeve proximate to the first peripheral rib. The cylindrical sleeve has an exterior surface proximate to the axial part that includes a second peripheral rib extending around the entire circumferential extent of the exterior surface, the rib has an outside diameter that is greater than the diameter of the axial part. A cylindrical seal has a geometric axis and an exterior surface dimensioned and configured for insertion into the first axial extremity of the cylindrical sleeve as well as for sealing engagement with the interior surface of the first axial extremity of the cylindrical sleeve, the first cylindrical seal has an interior surface dimensioned and configured for sealing engagement with the exterior surface of the first electrical conduit. A generally cylindrical clamp has an inboard section and an outboard section, the inboard section of the first generally cylindrical clamp being dimensioned and configured for encircling the first axial extremity of the cylindrical sleeve and the outboard section being dimensioned and configured for encircling the axial extremity of the electrical conduit, the outboard section being dimensioned and configured to have a first line contact with the associated first electrical conduit.

Some embodiments of the apparatus as described further include a first cylindrical seal that has an exterior surface dimensioned and configured for insertion into the first axial extremity of the cylindrical sleeve as well as for sealing engagement with the exterior surface of the first axial extremity of the cylindrical sleeve, the first cylindrical seal has an interior surface dimensioned and configured for sealing engagement with the exterior surface of the first electrical conduit is axially tapered whereby engagement of the exterior surface of the first electrical conduit is progressively tighter upon progressively greater axial engagement of the first electrical conduit.

The outboard section of the first generally cylindrical clamp may further include structure dimensioned and configured to have first and second line contacts with the associated first electrical conduit. The first and second line contacts may be disposed within respective planes that are normal to the geometric axis. The line contacts may be achieved with a knife edge shaped surface.

Each generally cylindrical clamp may include an arcuate band has first and second extremities to which respective first and second generally planar plates are fixed, the first and second plates including bores therein accommodating a threaded fastener whereby rotation of the threaded fastener tightens the generally cylindrical clamp.

The cylindrical sleeve may have an exterior surface proximate to the first axial extremity that includes first and second peripheral ribs extending around the entire circumferential extent of the cylindrical sleeve. The first generally cylindrical clamp may have an inboard section and an outboard section, the inboard section of the first generally cylindrical clamp being dimensioned and configured for encircling the first axial extremity of the cylindrical sleeve being dimensioned and configured for nesting engagement with the first and second peripheral ribs whereby the stability of the engagement is enhanced.

It is an object of the present invention to provide embodiments that are raintight and can be installed rapidly and easily without awkward motions.

It is another object of the present invention to provide a coupling or connector that can very rapidly be installed, for example, with an electric screwdriver.

It is yet another object of the present invention to utilize the economies of scale to provide additional very similar other embodiments that do not include the seal that is required for raintight outdoor applications, Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. Although specific features of various exemplary embodiments of the invention may be shown in some drawings and not in others, this is for convenience only. In accordance with the principles of the invention, any feature of a drawing may be referenced and/or claimed in combination with any feature of any other drawing.

The invention, however, both as to organization and method of practice, together with the further objects and advantages thereof, may best be understood by reference to the following description taken in connection with the accompanying drawings in which.

DETAILED DESCRIPTION

Referring now to FIGS. 1-8 there is shown a coupling 10 in accordance with one form of the present invention. Couplings in accordance with the present invention will ordinarily utilize attachment means in accordance with the present invention on each end of the coupling. Connectors in accordance with the present invention utilize only one attachment means in accordance with the present invention at one end thereof. More specifically, connectors, for example, the other end of the connector may use a lock nut on a threaded part of the connector at the other end.

Figure 1:
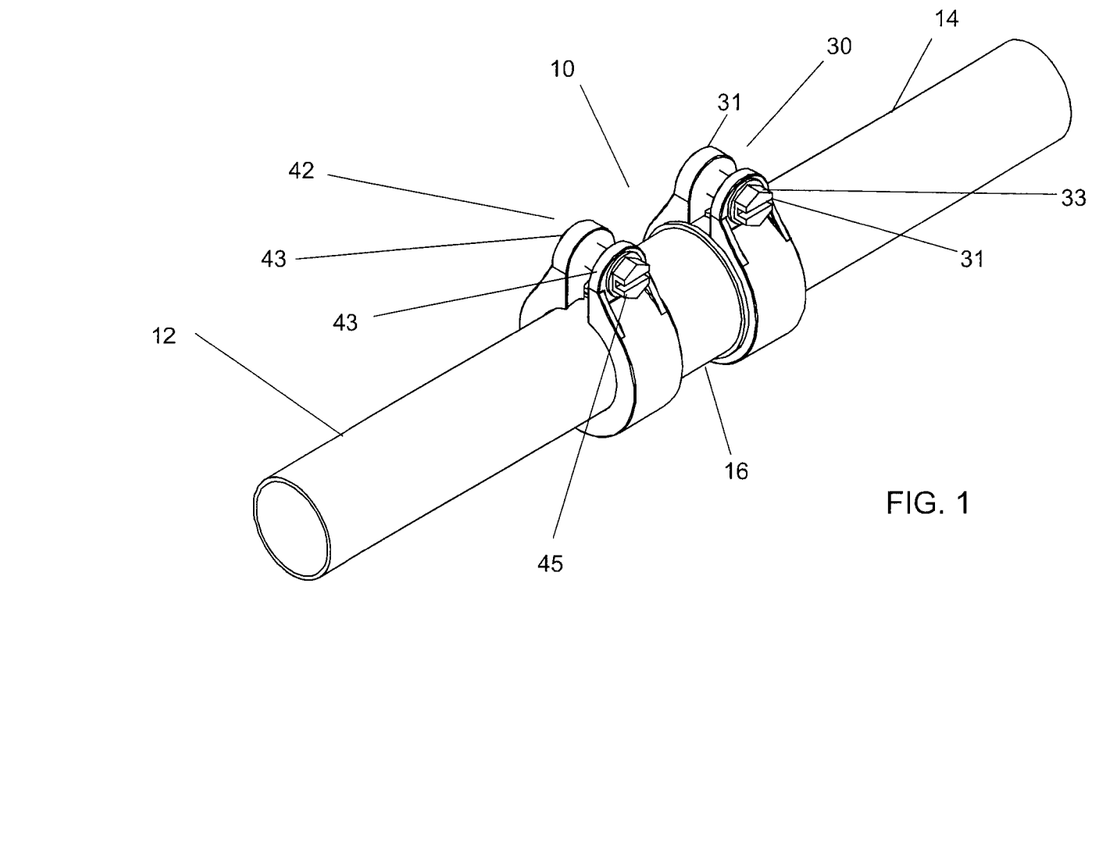
FIG. 1 is an isometric view of a coupling in accordance with one form of the present invention engaged with first and second conduits.
Figure 2:
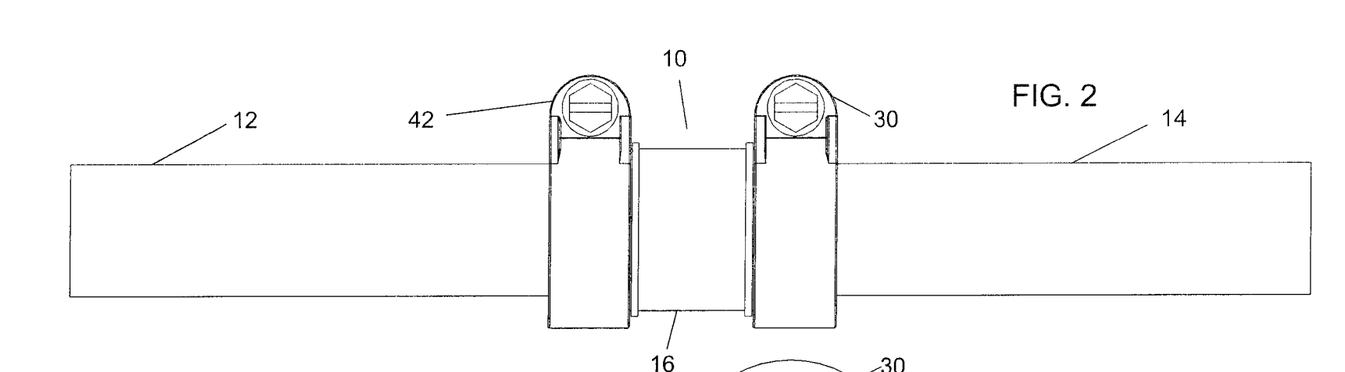
FIG. 2 is a side view of the coupling shown in FIG. 1.
Figure 3:
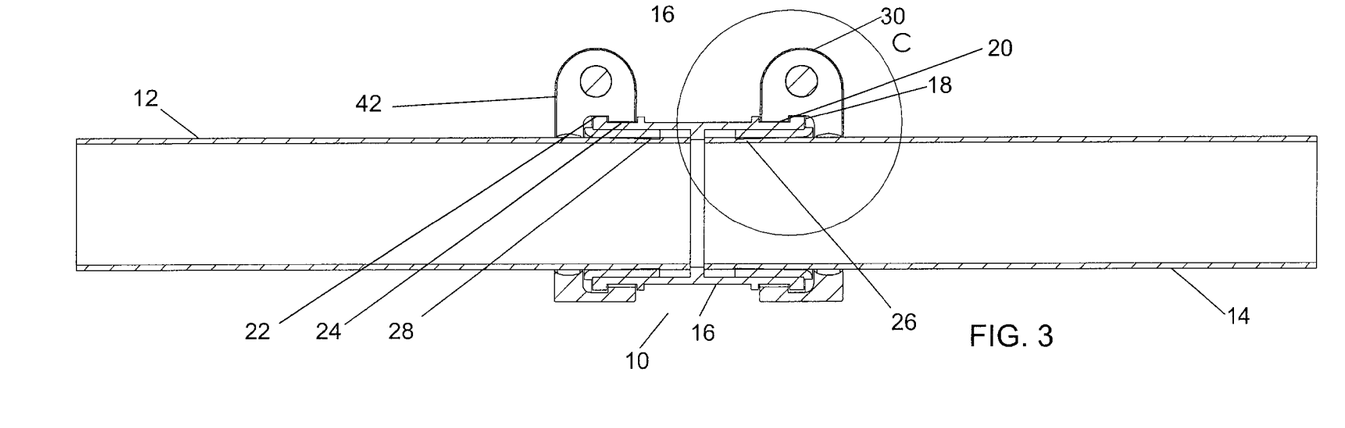
FIG. 3 is a sectional view of the coupling shown in FIG. 2.
Figure 4:
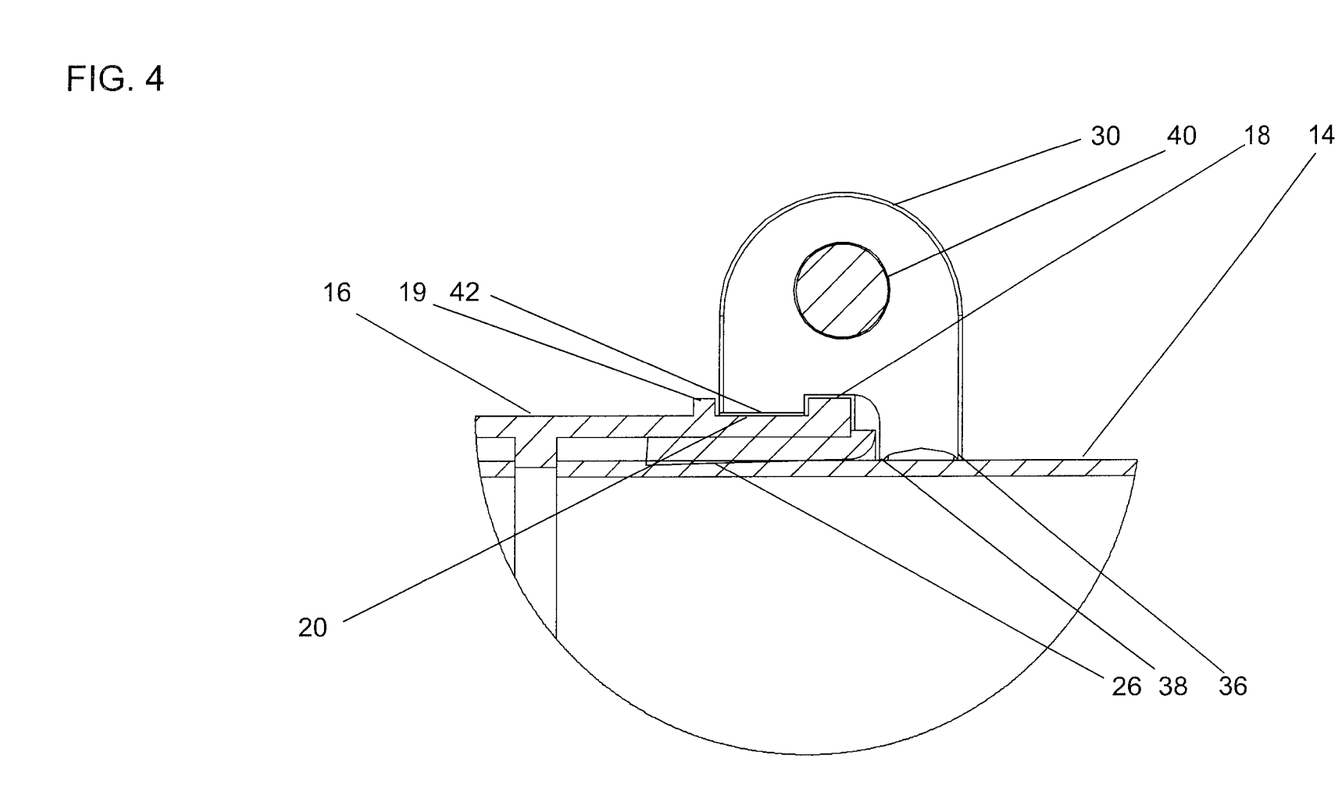
FIG. 4 is an enlarged sectional view of the part of the coupling shown in FIG. 3 identified by the circle C.
Figure 5:
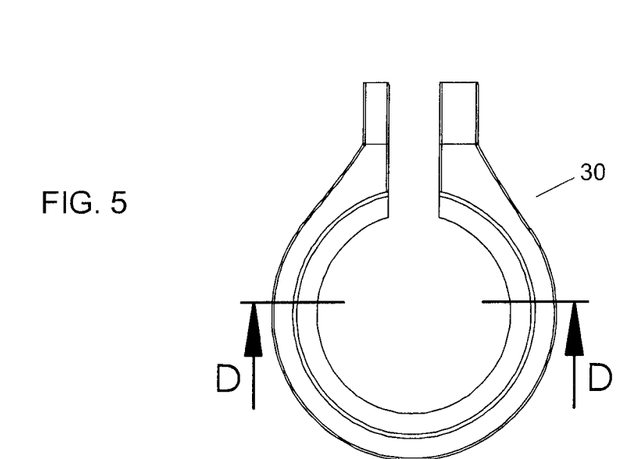
FIG. 5 is a side view of a clamp shown in FIG. 1.

The coupling 10 for joining respective axial extremities of associated first and second conduits 12, 14 includes a cylindrical sleeve or body 16 having an interior surface and an exterior surface as well as a first axial extremity and a second axial extremity and a geometric axis. As best seen in FIGS. 3 and 4 the cylindrical sleeve 16 has an exterior surface proximate to the first axial extremity that includes a first peripheral rib 18 extending around the entire circumferential extent of the exterior surface. The first peripheral rib 18 has an outside diameter that is greater than the diameter of the part 20 of the cylindrical sleeve 16 proximate to said first axial extremity.

Similarly, the cylindrical sleeve 16 has an exterior surface proximate to the second axial extremity that includes a second peripheral rib 22 extending around the entire circumferential extent of the exterior surface, the rib 22 also has an outside diameter is greater than the diameter of the part 24 of the cylindrical sleeve proximate to the second axial extremity;

A first cylindrical seal 26 has an exterior surface dimensioned and configured for insertion into the first axial extremity of the cylindrical sleeve 16 as well as for sealing engagement with said interior surface of said first axial extremity of the cylindrical sleeve 16, the first cylindrical seal 26 has an interior surface dimensioned and configured for sealing engagement with the exterior surface of the first electrical conduit 14. The first cylindrical seal 26 also has a geometric axis. As best seen in FIG. 4 the cylindrical seal 26 has an axially extending taper whereby progressively greater insertion of the section of electrical conduit 14 results in a tighter engagement with the first electrical conduit 14.

The coupling 10 also includes a second cylindrical seal 28 (Ordinarily, identical to the seal 26) having an exterior surface dimensioned and configured for insertion into the interior surface of the second axial extremity of the cylindrical sleeve 16 as well as for sealing engagement with the interior surface of the cylindrical sleeve 16. The second cylindrical seal has an interior surface dimensioned and configured for sealing engagement with the exterior of the second electrical conduit 12. In a preferred embodiment, the cylindrical seal 28 also has an axially extending taper whereby progressively greater insertion of the section of electrical conduit 12 results in a tighter engagement with the second electrical conduit 12.

The apparatus further includes a first generally cylindrical clamp 30 having an inboard section and an outboard section. The terms inboard and outboard will be understood to refer to the placement of the respective section with respect to the axial center of the cylindrical sleeve 16. As best seen in FIG. 4, the inboard section of the first generally cylindrical clamp 30 is dimensioned and configured for encircling said first axial extremity of the cylindrical sleeve 16 and the outboard section is dimensioned and configured for encircling the axial extremity of the associated first electrical conduit 14.

Figure 6:
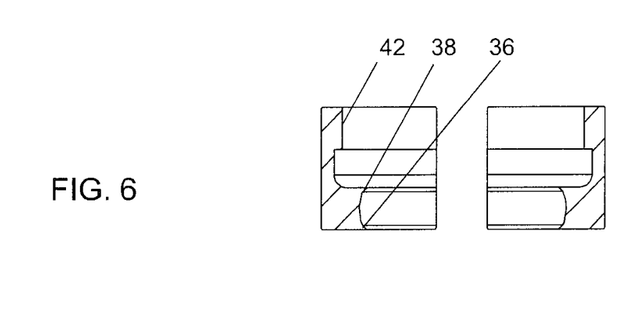
FIG. 6 is a sectional view of the clamp shown in FIG. 5 taken along the line D-D shown in FIG. 5.
Figure 7:
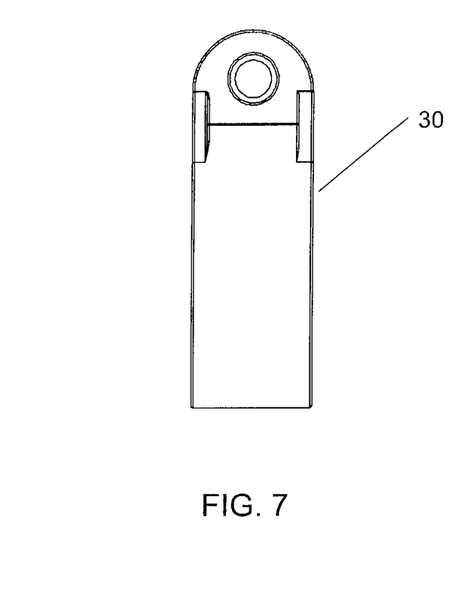
FIG. 7 is a side view of the clamp shown in FIG. 5.
Figure 8:
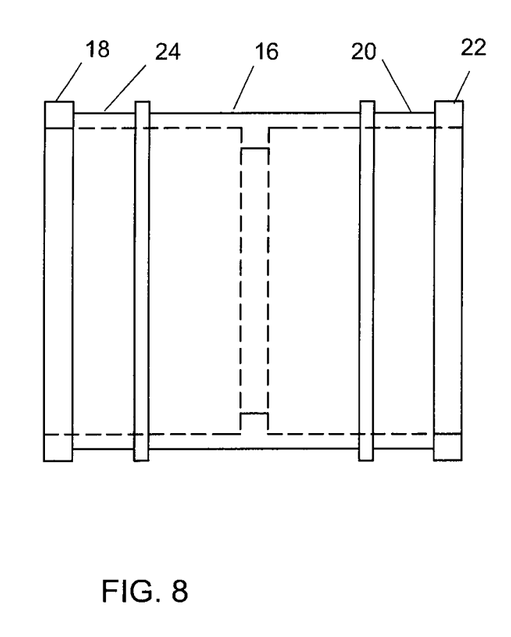
FIG. 8 is a side view of the coupling body shown in FIG. 3.
Figure 9:
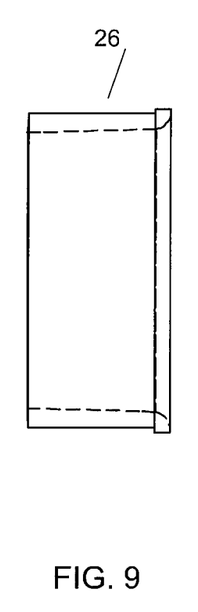
FIG. 9 is a side view of the seal best shown in FIG. 3.
Figure 10:
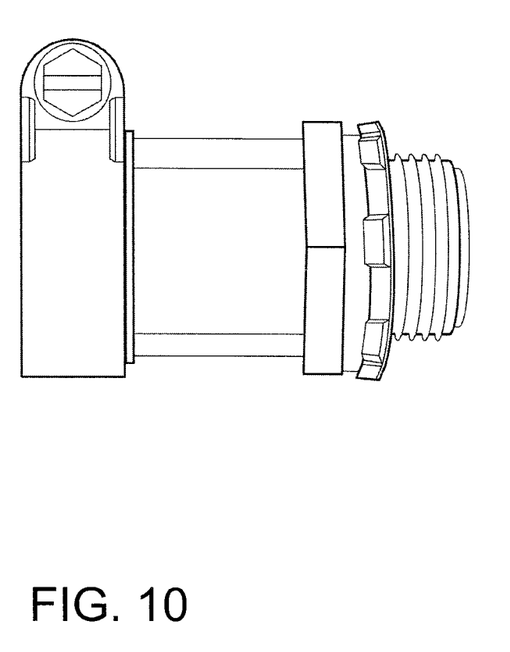
FIG. 10 is a side view of a coupling having a first axial extremity in accordance with the present invention and a second axial extremity having a conventional threaded sleeve carrying a locknut for attachment to, for example, connect to an electrical connection box.

More specifically, the outboard section is dimensioned and configured to have line contact with the associated first axial section of electrical conduit 14. More specifically, as best seen in FIGS. 4 and 6, edges 36, 38 make respective line contact in first and second spaced planes about the entire circular extent associated first electrical conduit 14. It will be understood that such line contact occurs because the edges 36 and 38 are sharply defined. For example, such a sharp definition may be equivalent to the sharpness of a steak knife. A threaded fastener 40 secures the clamp 30.

Still, more specifically, the inboard section includes a foot 42 dimensioned and configured for nesting engagement intermediate spaced circumferential ribs 18, 19 on the cylindrical sleeve 16. The clamp 30 includes lips 31 at each extremity of an arcuate band to accommodate a threaded fastener 33 that secures the clamp 30.

Embodiments of the coupling in accordance with the present invention further include a second generally cylindrical clamp 42 that is essentially the mirror image of the clamp 30. Thus, the clamp 42 also has an inboard section and an outboard section and the inboard section of the second generally cylindrical clamp is dimensioned and configured for encircling the second axial extremity of the cylindrical sleeve and the outboard section is dimensioned and configured for encircling the axial extremity of the associated second electrical conduit 12. The clamp 42 includes lips 43, 43 at respective extremities of an arcuate band to accommodate a threaded fastener 45.

The outboard section of the clamp 42 dimensioned and configured to have first and second line contacts with the associated second electrical conduit 12. The term "line contact" as used herein can be achieved by the surfaces 36, 38 having the sharpness equivalent to a steak knife.

Those skilled in the art will recognize that the apparatus in accordance with the present invention can be very rapidly installed with only an electric screwdriver and without concern for seals that may fall out and be reinstalled improperly.

Embodiments of the present invention may utilize a structure that makes line contact with the cylindrical sleeve 16. Although, the illustrated embedment shows first and second line contact in parallel spaced planes, other embodiments may utilize, for example, a helix shaped contact.

The description above has focused on coupling embodiments of the present invention wherein first and second axial sections of conduit are secured together in a manner that is raintight. Other embodiments of the present invention, for example, connectors for making a raintight connection to a junction box may incorporate the same structure for connection to an axial section of conduit with a cylindrical sleeve 16 that has one axial extremity as described above and a second axial extremity provided with apparatus that is conventional such as locknut assemblies.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A connector for joining respective axial extremities of associated first and second electrical conduits which comprises:
a cylindrical sleeve having an interior surface and an exterior surface as well as a first axial extremity and a second axial extremity and a geometric axis,
said cylindrical sleeve having an exterior surface proximate to said first axial extremity that includes a first peripheral rib extending around the entire circumferential extent of said exterior surface, said first peripheral rib having an outside diameter is greater than the diameter of said cylindrical sleeve proximate to said first axial extremity;
said cylindrical sleeve having an exterior surface proximate to said second axial extremity that includes a second peripheral rib extending around the entire circumferential extent of said exterior surface, said rib having an outside diameter is greater than the diameter of said cylindrical sleeve proximate to said second axial extremity;
a first generally cylindrical clamp having an inboard section and an outboard section, said inboard section of said first generally cylindrical clamp being dimensioned and configured for encircling said first axial extremity of said cylindrical sleeve and said outboard section being dimensioned and configured for encircling the axial extremity of the associated first electrical conduit, said outboard section being dimensioned and configured to have a first line contact with the associated first electrical conduit; and
a second generally cylindrical clamp having an inboard section and an outboard section, said inboard section of said second generally cylindrical clamp being dimensioned and configured for encircling said second axial extremity of said cylindrical sleeve and said outboard section being dimensioned and configured for encircling the axial extremity of the associated second electrical conduit, said outboard section being dimensioned and configured to have a second line contact with the associated second electrical conduit.

2. A connector as described in claim 1 further including:
a first cylindrical seal having an exterior surface dimensioned and configured for insertion into said first axial extremity of said cylindrical sleeve as well as for sealing engagement with said interior surface of said first axial extremity of said cylindrical sleeve, said first cylindrical seal having an interior surface dimensioned and configured for sealing engagement with the exterior surface of the first electrical conduit; and a geometric axis coincident with the geometric axis of said cylindrical sleeve, and
a second cylindrical seal having an exterior surface dimensioned and configured for insertion into said interior surface of second axial extremity of said cylindrical sleeve as well as for sealing engagement with said interior surface of second axial extremity of said cylindrical sleeve, said second cylindrical seal having an interior surface dimensioned and configured for sealing engagement with the exterior of the second electrical conduit and a geometric axis coincident with the geometric axis of said cylindrical sleeve.

3. A connector as described in claim 2 wherein said outboard section of said first generally cylindrical clamp further includes structure dimensioned and configured to have a third line contact with the associated first electrical conduit.

4. A connector as described in claim 2 wherein said outboard section of said second generally cylindrical clamp further includes structure dimensioned and configured to have a fourth line contact with the associated second electrical conduit.

5. A connector as described in claim 1 wherein said first line contact is disposed within a third plane that is normal to said geometric axis.

6. A connector as described in claim 5 wherein said fourth line contact is disposed within a fourth plane that is normal to said geometric axis and spaced from said plane.

7. A connector as described in claim 5 wherein said outboard section of each generally cylindrical clamp that is dimensioned and configured to have a third line contact with the associated second electrical conduit has a knife edge contour.

8. A connector as described in claim 1 wherein each generally cylindrical clamp includes an arcuate band having first and second extremities to which respective first and second generally planar plates are fixed, said first and second plates including bores therein accommodating a threaded fastener whereby rotation of the threaded fastener tightens the generally cylindrical clamp.

9. A connector as described in claim 8 wherein said first and second peripheral ribs proximate to said first axial extremity of said cylindrical sleeve are disposed in spaced relationship.

10. A connector as described in claim 9 wherein said cylindrical sleeve having an exterior surface proximate to said first axial extremity that includes a first peripheral rib extending around the entire circumferential extent of said exterior surface, said first peripheral rib having an outside diameter that is greater than the diameter of said cylindrical sleeve proximate to said first peripheral rib and further includes a second peripheral rib extending around the entire circumferential extent of said exterior surface, said first and second peripheral ribs having outside diameters greater than the diameter of said cylindrical sleeve intermediate said first and second peripheral ribs.

11. A connector as described in claim 10 wherein said first generally cylindrical clamp having an inboard section and an outboard section, said inboard section of said first generally cylindrical clamp being dimensioned and configured for encircling said first axial extremity of said cylindrical sleeve being dimensioned and configured for engagement with said first and second peripheral ribs whereby the stability of the engagement is enhanced.

12. A connector as described in claim 11 wherein said cylindrical sleeve has an exterior surface proximate to said second axial extremity that includes first and second spaced peripheral ribs extending around the entire circumferential extent of said exterior surface, said first and second peripheral ribs having an outside diameter is greater than the diameter of said cylindrical sleeve intermediate said first and second peripheral ribs.

13. A connector as described in claim 9 wherein said second generally cylindrical clamp having an inboard section and an outboard section, said inboard section of said first generally cylindrical clamp being dimensioned and configured for encircling said first axial extremity of said cylindrical sleeve and having nesting engagement with said first and second peripheral ribs and the part of the cylindrical sleeve intermediate said first and second peripheral ribs whereby the stability of the engagement is enhanced.

14. A connector as described in claim 13 wherein said first cylindrical seal has an exterior surface dimensioned and configured for insertion into said first axial extremity of said cylindrical sleeve as well as for sealing engagement with said exterior surface of said first axial extremity of said cylindrical sleeve, said first cylindrical seal having an interior surface dimensioned and configured for sealing engagement with the exterior surface of the associated first electrical conduit is axially tapered whereby engagement of the exterior surface of the first electrical conduit is progressively tighter upon progressively greater axial engagement of the associated first electrical conduit.

15. Apparatus for attachment to an axial extremity of an associated metallic electrical conduit which comprises:
a cylindrical sleeve having an interior surface and an exterior surface as well as a first axial extremity and a second axial extremity and a geometric axis,
said cylindrical sleeve having an exterior surface proximate to said first axial extremity that includes a first peripheral rib extending around the entire circumferential extent of said exterior surface, said first peripheral rib having an outside diameter is greater than the diameter of an axial part of said cylindrical sleeve proximate to said first peripheral rib;
said cylindrical sleeve having an exterior surface proximate to said axial part that includes a second peripheral rib extending around the entire circumferential extent of said exterior surface, said rib having an outside diameter that is greater than the diameter of said axial part;
a cylindrical seal having a geometric axis and an exterior surface dimensioned and configured for insertion into said first axial extremity of said cylindrical sleeve as well as for sealing engagement with said interior surface of said first axial extremity of said cylindrical sleeve, said first cylindrical seal having an interior surface dimensioned and configured for sealing engagement with the exterior surface of said first axial section of electrical conduit;
a generally cylindrical clamp having an inboard section and an outboard section, said inboard section of said first generally cylindrical clamp being dimensioned and configured for encircling said first axial extremity of said cylindrical sleeve and said outboard section being dimensioned and configured for encircling the axial extremity of the associated first axial section of electrical conduit, said outboard section being dimensioned and configured to have a first line contact with the associated first axial section of electrical conduit.

16. Apparatus as described in claim 15 further including a first cylindrical seal having an exterior surface dimensioned and configured for insertion into said first axial extremity of said cylindrical sleeve as well as for sealing engagement with said exterior surface of said first axial extremity of said cylindrical sleeve, said first cylindrical seal having an interior surface dimensioned and configured for sealing engagement with the exterior surface of said first axial section of electrical conduit is axially tapered whereby engagement of the exterior surface of said first axial section of electrical conduit is progressively tighter upon progressively greater axial engagement of said first axial section of electrical conduit.

17. Apparatus as described in claim 16 wherein said outboard section of said first generally cylindrical clamp further includes structure dimensioned and configured to have a second line contact with the associated first axial section of electrical conduit.

18. Apparatus as described in claim 17 wherein said first line contact is disposed within a first plane that is normal to said geometric axis.

19. Apparatus as described in claim 18 wherein said second line contact is disposed within a second plane that is normal to said geometric axis.

20. Apparatus as described in claim 17 wherein said outboard section is dimensioned and configured to have a first line contact with the associated first electrical conduit has a knife edge.

21. Apparatus as described in claim 20 wherein said outboard section being dimensioned and configured to have a second line contact with the associated first electrical conduit has a knife edge.

22. Apparatus as described in claim 19 wherein each generally cylindrical clamp includes an arcuate band having first and second extremities to which respective first and second generally planar plates are fixed, said first and second plates including bores therein accommodating a threaded fastener whereby rotation of the threaded fastener tightens the generally cylindrical clamp.

23. Apparatus as described in claim 22 wherein said cylindrical sleeve has an exterior surface proximate to said first axial extremity that includes a first peripheral rib extending around the entire circumferential extent of said exterior surface and an axial part of said cylindrical sleeve proximate to said first peripheral rib having a diameter less than the diameter of said first peripheral rib.

24. Apparatus as described in claim 23 further including a second peripheral rib extending around the entire circumferential extent of said exterior surface, said second peripheral abutting said axial part of said cylindrical sleeve and spaced from said first peripheral rib extending around the entire circumferential extent of said exterior surface.

25. Apparatus as described in claim 23 wherein said first generally cylindrical clamp has an inboard section and an outboard section, said inboard section of said first generally cylindrical clamp being dimensioned and configured for encircling said first axial extremity of said cylindrical sleeve being dimensioned and configured for nesting engagement with said first and second peripheral ribs whereby the stability of the engagement is enhanced.

* * * * *